US008098925B2

(12) United States Patent
Silvestri et al.

(10) Patent No.: US 8,098,925 B2
(45) Date of Patent: Jan. 17, 2012

(54) PHOTOCONDUCTORS AND PROCESSES THEREOF

(75) Inventors: Markus R. Silvestri, Fairport, NY (US); Jin Wu, Webster, NY (US); M. John Hinckel, Rochester, NY (US); David M. Skinner, Rochester, NY (US); Kent J. Evans, Lima, NY (US); Robert J. Meyer, Penfield, NY (US); Kathleen M. Carmichael, Williamson, NY (US); Dale S. Renfer, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 564 days.

(21) Appl. No.: 12/269,762

(22) Filed: Nov. 12, 2008

(65) Prior Publication Data

US 2010/0119963 A1 May 13, 2010

(51) Int. Cl.
*G06K 7/10* (2006.01)

(52) U.S. Cl. ........... 382/141; 430/56; 430/57.1; 430/67; 430/123.4

(58) Field of Classification Search .................... 430/56, 430/123.4, 57.1, 67; 382/141
See application file for complete search history.

(56) References Cited

U.S. PATENT DOCUMENTS

| | | | |
|---|---|---|---|
| 4,518,669 | A | 5/1985 | Yashiki |
| 4,579,801 | A | 4/1986 | Yashiki |
| 4,775,605 | A | 10/1988 | Seki et al. |
| 5,017,449 | A | 5/1991 | Yoshihara |
| 5,344,734 | A | 9/1994 | Monbaliu et al. |
| 5,489,496 | A | 2/1996 | Katayama et al. |
| 5,641,599 | A | 6/1997 | Markovics et al. |
| 5,656,407 | A | 8/1997 | Kawahara |
| 5,721,080 | A | 2/1998 | Terrell et al. |
| 6,180,309 | B1 | 1/2001 | Maty et al. |
| 6,200,716 | B1 | 3/2001 | Fuller et al. |
| 6,207,334 | B1 | 3/2001 | Dinh et al. |
| 2007/0292784 | A1 | 12/2007 | Wu et al. |
| 2007/0292793 | A1 | 12/2007 | Wu et al. |

*Primary Examiner* — Peter Vajda
(74) *Attorney, Agent, or Firm* — Pillsbury Winthrop Shaw Pittman LLP

(57) ABSTRACT

The presently disclosed embodiments relate in general to electrophotographic imaging members, such as layered photoreceptor structures, and processes for making and using the same. More particularly, the embodiments pertain to an improved photoreceptor that exhibits little to no response to injected charges and demonstrates excellent ghosting properties.

21 Claims, 1 Drawing Sheet

PHOTOCONDUCTORS AND PROCESSES THEREOF

BACKGROUND

Herein disclosed are imaging members, such as layered photoreceptor structures, and processes for making and using the same. The imaging members can be used in electrophotographic, electrostatographic, xerographic and like devices, including printers, copiers, scanners, facsimilies, and including digital, image-on-image, and like devices. More particularly, in embodiments there is disclosed a photoreceptor that exhibits excellent ghosting characteristics due primarily, it is believed, to the property of the photoreceptor exhibiting little or no response to a known number of injected positive charges at for example, a specific time after injection and processes for testing the photoreceptor attributes to thereby control, minimize, or eliminate paper edging and ghosting. More specifically there is disclosed processes for identifying photoreceptors which are encompassed by the testing methods disclosed and photoreceptors which are not encompassed by the testing methods disclosed to thus arrive at photoreceptors with desirable properties with improved performance as compared for example, to photoreceptors which are not encompassed by the aforemtioned testing methods.

Electrophotographic imaging members, e.g., photoreceptors, include a photoconductive layer formed on an electrically conductive substrate. The photoconductive layer is an insulator in the substantial absence of light so that electric charges are retained on its surface. Upon exposure to light, charge is generated by the photoactive layer, and under applied field charge moves through the photoreceptor and the charge is dissipated.

In electrophotography, such as xerography, electrophotographic imaging or electrostatographic imaging, the surface of an electrophotographic plate, drum, belt or the like, imaging member or photoreceptor, containing a photoconductive insulating layer on a conductive layer is first uniformly electrostatically charged. The imaging member is then exposed to a pattern of activating electromagnetic radiation, such as light. Charge generated by the photoactive layer move under the force of the applied field. The movement of the charge through the photoreceptor selectively dissipates the charge on the illuminated areas of the photoconductive insulating layer while leaving behind an electrostatic latent image. This electrostatic latent image may then be developed to form a visible image by depositing charged particles of same or opposite polarity on the surface of the photoconductive insulating layer. The resulting visible image may then be transferred from the imaging member directly or indirectly, such as by a transfer member, to a print substrate, such as a transparency or paper. The imaging process may be repeated many times with reusable imaging members.

An electrophotographic imaging member may be provided in a number of forms. For example, the imaging member may be a homogeneous layer of a single material such as vitreous selenium or it may be a composite layer containing a photoconductor and another material. In addition, the imaging member may be layered. These layers can be in any order, and sometimes can be combined in a single or mixed layer.

Multilayered photoreceptors have at least two layers, and may include a substrate, a conductive layer, an optional charge blocking layer, an optional adhesive layer, a photogenerating layer, sometimes referred to as a "charge generation layer," "charge generating layer," or "charge generator layer", a charge transport layer, an optional overcoating layer and, in some belt embodiments, an anticurl backing layer. In the multilayer configuration, the active layers of the photoreceptor are the charge generation layer (CGL) and the charge transport layer (CTL). Enhancement of charge transport across these layers provide better photoreceptor performance.

The demand for improved print quality in xerographic reproduction is increasing. Common print quality issues are strongly dependent on the quality of the different photoreceptor layers. A common problem includes "ghosting," which is thought to result from the accumulation of charge somewhere in the photoreceptor. Consequently, when a sequential image is printed, the accumulated charge results in image density changes in the current printed image that reveals the previously printed image. Thus, there is a need, which is addressed herein, for a way to minimize or eliminate charge accumulation or consequences thereof such as release of charge accumulation in photoreceptors in the sequential printed images and/or identify the photoreceptors which have such capability.

The terms "charge blocking layer" and "blocking layer" are generally used interchangeably with the phrase "undercoat layer."

Photoreceptors and their materials are disclosed in Katayama et al., U.S. Pat. No. 5,489,496; Yashiki, U.S. Pat. No. 4,579,801; Yashiki, U.S. Pat. No. 4,518,669; Seki et al., U.S. Pat. No. 4,775,605; Kawahara, U.S. Pat. No. 5,656,407; Markovics et al., U.S. Pat. No. 5,641,599; Monbaliu et al., U.S. Pat. No. 5,344,734; Terrell et al., U.S. Pat. No. 5,721,080; and Yoshihara, U.S. Pat. No. 5,017,449, which are herein incorporated by reference in their entirety.

Additional photoreceptors are disclosed in Fuller et al., U.S. Pat. No. 6,200,716; Maty et al., U.S. Pat. No. 6,180,309; Dinh et al., U.S. Pat. No. 6,207,334; U.S. Publication No. 2007/0292793; and U.S. Publication No. 2007/0292784, which are herein incorporated by reference in their entirety.

SUMMARY

According to embodiments illustrated herein, there is provided an improved photoreceptor and method of using in which print quality is improved, for example, ghosting is minimized or substantially eliminated in images printed in systems with high transfer current.

In one embodiment, there is a method comprising providing an photoreceptor comprising a substrate, an imaging layer disposed on the substrate, and an optional overcoat layer disposed on the imaging layer, wherein magnitude of an image potential of the photoreceptor does not decrease after having been injected with a positive charge density of a product of CV wherein C is a geometric capacitance of the photoreceptor per unit area and V is a potential of from about 300V to about 1000V.

In another embodiment, there is disclosed a photoreceptor comprising a substrate, an imaging layer disposed on the substrate, and an optional overcoat layer disposed on the imaging layer, wherein the magnitude of the image potential of the photoreceptor does not decrease by more than 1.5% after having been injected with a positive charge density of a product of CV, wherein C is a geometric capacitance of the photoreceptor per unit area from about 20 $pF/cm^2$ to about 500 $pF/cm^2$ and V is a potential of from about 300V to about 500V.

In another embodiment, there is provided an image forming method comprising (a) providing an photoreceptor having a substrate, an imaging layer disposed on the substrate, and an optional overcoat layer disposed on the imaging layer, wherein magnitude of an image potential of the photoreceptor does not decrease by more than 1.5% after having been injected with a positive charge density of a product of CV, wherein C is a geometric capacitance of the photoreceptor per unit area from about 20 $pF/cm^2$ to about 500 $pF/cm^2$ and V is a potential of from about 300V to about 1000V, (b) charging the photoreceptor, (c) irradiating the photoreceptor with light to form an electrostatic latent image on a surface of the photoreceptor, (d) developing the electrostatic latent image with a toner to form a toner image on the photoreceptor, and (e) transferring the toner image onto a receiving material.

In yet another embodiment, there is disclosed a method for identifying a photoreceptor exhibiting little to no ghosting, comprising providing an photoreceptor having a substrate, an imaging layer disposed on the substrate, and an optional overcoat layer disposed on the imaging layer, injecting the photoreceptor with a positive charge density of a product of CV, wherein C is a geometric capacitance of the photoreceptor per unit area from about 20 $pF/cm^2$ to about 500 $pF/cm^2$ and V is a potential of from about 300V to about 1000V, and monitoring a magnitude of an image potential of the photoreceptor after the injection, and identifying the photoreceptor when the magnitude of the unexposed image potential does not decrease by more than 1.5% after being injected as a photoreceptor that exhibits little to no ghosting.

BRIEF DESCRIPTION OF THE DRAWINGS

For a better understanding, reference may be had to the accompanying figure.

DETAILED DESCRIPTION

Figure 1:
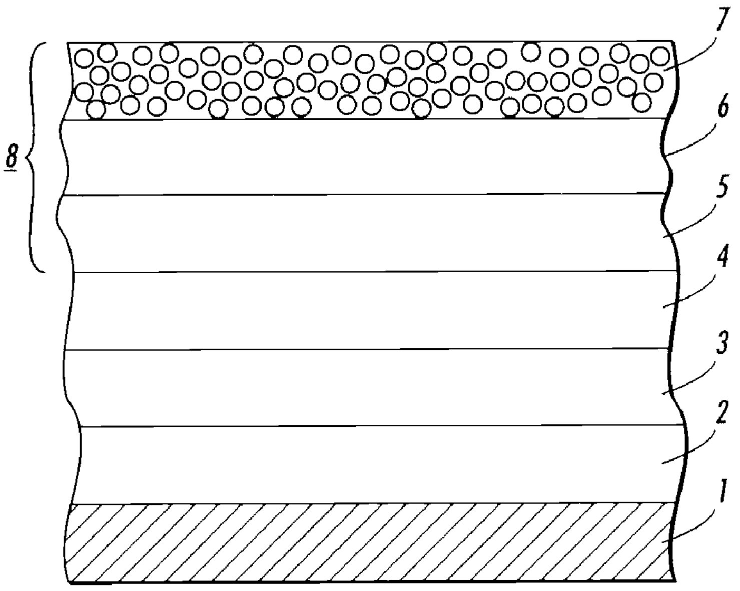
FIG. 1 is a cross-sectional view of a photoreceptor in accordance with the present embodiments.

It is understood that other embodiments may be utilized and structural and operational changes may be made without departure from the scope of the embodiments disclosed herein.

The embodiments relate to a photoreceptor that exhibits excellent ghosting properties due to a property of the photoreceptor of exhibiting little or no response to a known number of injected positive charges at a specific time after injection. In embodiments, the photoreceptor does not exhibit a drop or decrease in the image potential by more than a minimal amount, for example no more than 1.5%, after having been injected with a positive charge density of a product of CV, wherein C is a geometric capacitance of the photoreceptor per unit area from about 20 pF/ $cm^2$ to about 500 $pF/cm^2$ and V is a potential of from about 300 V to about 1000 V. In specific embodiments, the value of C is for example, from about add backup ranges throughout 50 $pF/cm^2$ to about 250 $pF/cm^2$ and V is a from about 300V to about 500V. These embodiments have been shown to eliminate paper edge and once around ghosting. Once-around ghosting refers to a ghost from the previous print that lasts only for one xerographic cycle. Paper edge ghosting is a print defect that occurs when the paper size is switched from a small format to a larger format—the edge of the smaller paper sheet becomes visible in the following prints on the larger sheets. Depending on the severity, the paper edge ghost may last longer than just one xerographic cycle.

Generally, an electrophotographic imaging member is provided, which generally comprises at least a substrate layer, an imaging layer disposed on the substrate and an optional overcoat layer disposed on the imaging layer. In further embodiments, the imaging layer comprises a charge generation layer disposed on the substrate and the charge transport layer disposed on the charge generation layer. In other embodiments, an undercoat layer may be included and is generally located between the substrate and the imaging layer, although additional layers may be present and located between these layers. The imaging member may also include anticurl back coating layer in certain embodiments. The imaging member can be employed in the imaging process of electrophotography, where the surface of an electrophotographic plate, drum, belt or the like (imaging member or photoreceptor) containing a photoconductive insulating layer on a conductive layer is first uniformly electrostatically charged. The imaging member is then exposed to a pattern of activating electromagnetic radiation, such as light. The radiation selectively dissipates the charge on the illuminated areas of the photoconductive insulating layer while leaving behind an electrostatic latent image. This electrostatic latent image may then be developed to form a visible image by depositing charged particles of same or opposite polarity on the surface of the photoconductive insulating layer. The resulting visible image may then be transferred from the imaging member directly or indirectly (such as by a transfer or other member) to a print substrate, such as transparency or paper. The imaging process may be repeated many times with reusable imaging members.

Common print quality issues are strongly dependent on the quality and interaction of these photoreceptor layers. For example, a common problem is "ghosting," which is thought to result from the accumulation of charge somewhere in the photoreceptor. Consequently, when a sequential image is printed, the accumulated charge results in image density changes in the current printed image that reveals the previously printed image. In the xerographic process spatially varying amounts of positive charges from the transfer station find themselves on the photoreceptor surface. If this variation is large enough it will manifest itself as a variation in the image potential in the following xerographic cycle and print out as a defect commonly known as a "ghost."

There are different types of ghosting, such as a paper edge ghost, which occurs in certain print engines. A way to address this ghosting is to reduce the exposure of the photoreceptor to spatially varying positive charge from the transfer station. This can be expensive or detrimentally affect other important xerographic processes, e.g., reducing the transfer current reduces the magnitude of the spatial variation but also degrades the transfer efficiency. To eliminate this defect and avoid the need to address ghosting through the aforementioned methods, the present embodiments employ an improved photoreceptor, and methods of making and using, that exhibits no or little response to a known number of injected positive charges at a specific time after injection.

As currently understood, formation of the paper edge ghost requires at least four steps. First is fatiguing of the photoreceptor surface. It is found that after several thousands of fatiguing prints the inter-document zone holds less positive charge than the area where the paper was located—this can only occur if the inter-document zone injects more positive charge. Corona effluents form the transfer station can be readily attributed to this fatiguing. In this step, the paper works as a mask. Second, by switching to a larger paper size, both areas, the fatigued inter-document zone and the protected paper area in the first step, are uniformly exposed to positive charges (e.g., some charges leak through the paper). Due to the previous fatiguing, there will be a differential injection of positive charges. Third, a fraction of these injected positive charges remain in the photoreceptor. Fourth, in the following print cycle the positive charges are released and as a result reduce the image potential. In half tone prints the inter-document zone appears darker. The damage of the photoreceptor surface in the first step does not readily disappear or heal and, consequently, the differential positive charge injection continues to happen. As a result the paper edge ghost is visible over many print cycles. The photoreceptor of the present embodiments neutralizes step three and four.

Even if the surface is not damaged a ghost like the paper edge ghost can occur. If the paper size is switched form a smaller to a larger size and if there is no print-free cycle between switching paper sizes, then within the area of the larger prints there is differential positive charge injection because the smaller paper size protected only part of the area. This differential charge injection occurs only once, namely during this paper size change and, as a result, the ghost will occur only once in the following print cycle. Because the ghost occurs only once, it is called once-around ghosting; however, it can be quite strong if the paper protects the photoreceptor well which can be the case for thick, heavy-weight paper.

To address the above-mentioned problems, the embodiments relate to a photoreceptor that exhibits excellent ghosting properties due to a property of exhibiting little or no response to a known number of injected positive charges at a specific time after injection. In embodiments, the photoreceptor does not exhibit a drop or decrease in the image potential by more than 1.5% after having been injected with a positive charge of a product of CV where C is the geometric capacitance of the photoreceptor per unit area and V is a potential of from about 300V to about 1000V or from about 300V to about 500V. In other embodiments, the image potential decreases from about 1% to about 1.5%.

An image forming method using the photoreceptor comprises providing an photoreceptor having a substrate, an imaging layer disposed on the substrate, and an optional overcoat layer disposed on the imaging layer, wherein magnitude of an image potential of the photoreceptor does not drop by more than 1.5% after having been injected with a positive charge of a charge product of CV where C is the geometric capacitance of the photoreceptor per unit area and V is a potential of from about 300V to about 1000V or from about 300V to about 500V, charging the photoreceptor, irradiating the photoreceptor with light to form an electrostatic latent image on a surface of the photoreceptor, developing the electrostatic latent image with a toner to form a toner image on the photoreceptor, and transferring the toner image onto a receiving material. In one embodiment, the geometric capacitance is from about 20 $pF/cm^2$ to about 500 $pF/cm^2$ or from about 50 $pF/cm^2$ to about 250 $pF/cm^2$. In further embodiments, the image potentials of the photoreceptor are from about −200V to about −1500V. The imaging layer may further comprise a charge generation layer disposed on the substrate and a charge transport layer disposed on the charge generation layer.

In further embodiments, a method for identifying a photoreceptor exhibiting little to no ghosting, comprising providing an photoreceptor having a substrate, an imaging layer disposed on the substrate, and an optional overcoat layer disposed on the imaging layer, injecting the photoreceptor with a positive charge density of a product of CV where C is the geometric capacitance of the photoreceptor per unit area and V is a potential of from about 300V to about 500V, and monitoring a magnitude of an image potential of the photoreceptor after the injection, and identifying the photoreceptor when the magnitude of the unexposed image potential does not drop by more than 1.5% after being injected as a photoreceptor that exhibits little to no ghosting.

The method further subjects the photoreceptor to, for example, ten cycles of charging, exposing and erasing before being injected with the positive charge density at the end of the last cycle of the ten cycles. In embodiments, the charging time ranges from about 20 milliseconds to about 200 milliseconds and the charging potential ranges from about −300V to about −1000V, and the charging time is about 100 milliseconds while the charging potential is about −600V. In other embodiments, the overall cycle time ranges from about 0.5 seconds to about 3.0 seconds. The method further includes removing any remaining potential on the photoreceptor surface after injecting with the positive charge density. The positive charge density may be injected between 100 milliseconds and 1000 milliseconds before the charging step of the next cycle, and the change in the magnitude of the image potential is measured by comparing the magnitude of the image potential in cycles subsequent to the tenth cycle and the magnitude of the image potential in the tenth cycle. In embodiments, the image potential is measured between about 0 milliseconds to about 1000 millseconds after charging. In further embodiments, the image potential is measured in an environment of 40% relative humidity at 22° C. The photoreceptor is generally rested in an environment of 40% relative humidity at 22° C. in the dark for at least two days prior to measuring. In specific embodiments of the method, the charging is applied through a gold electrode or applied through ions from a corona device.

Electrophotographic imaging members may be prepared by any suitable technique. Referring to FIG. 1, a flexible or rigid substrate 1 is provided with an electrically conductive surface or coating 2. The substrate may be opaque or substantially transparent and may comprise any suitable material having the required mechanical properties. Accordingly, the substrate may comprise a layer of an electrically non-conductive or conductive material such as an inorganic or an organic composition. As electrically non-conducting materials, there may be employed various resins known for this purpose including polyesters, polycarbonates, polyamides, polyurethanes, and the like which are flexible as thin webs. An electrically conducting substrate may be any metal, for example, aluminum, nickel, steel, copper, and the like or a polymeric material, as described above, filled with an electrically conducting substance, such as carbon, metallic powder, and the like or an organic electrically conducting material. The electrically insulating or conductive substrate may be in the form of an endless flexible belt, a web, a rigid cylinder, a sheet and the like. The thickness of the substrate layer depends on numerous factors, including strength desired and economical considerations. Thus, for a drum, this layer may be of substantial thickness of, for example, up to many centimeters or of a minimum thickness of less than a millimeter. Similarly, a flexible belt may be of substantial thickness, for example, about 250 micrometers, or of minimum thickness less than 50 micrometers, provided there are no adverse effects on the final electrophotographic device, although the thickness can also be outside of these ranges.

Substrate Examples

A number of different materials can be used for the substrate, including conductive and non-conductive materials.

In embodiments where the substrate layer is not conductive, the surface thereof may be rendered electrically conductive by an electrically conductive coating 2. The conductive coating may vary in thickness over substantially wide ranges depending upon the optical transparency, degree of flexibility desired, and economic factors. Accordingly, for a flexible photoresponsive imaging device, the thickness of the conductive coating may be, in one embodiment, at least 20 angstroms, or no more than 750 angstroms. In another embodiment, the thickness is at least 100 angstroms, or no more than 200 angstroms for an optimum combination of electrical conductivity, flexibility and light transmission, although the thickness can be outside of these ranges. The flexible conductive coating may be an electrically conductive metal layer formed, for example, on the substrate by any suitable coating technique, such as a vacuum depositing technique or electrodeposition. Suitable metals include aluminum, zirconium, niobium, tantalum, vanadium and hafnium, titanium, nickel, stainless steel, chromium, tungsten, molybdenum, and the like.

Hole Blocking Layer Examples

An optional hole blocking layer 3 may be applied to the substrate 1 or coating. Any suitable and conventional blocking layer capable of forming an electronic barrier to holes or positive charges between the adjacent photoconductive layer 8 (or electrophotographic imaging layer 8) and the underlying conductive surface 2 of substrate 1 may be used.

Adhesive Layer Examples

An optional adhesive layer 4 may be applied to the hole-blocking layer 3. Any suitable adhesive layer well known in the art may be used. Suitable adhesive layer materials include, for example, polyesters, polyurethanes, and the like. Satisfactory results may be achieved with adhesive layer thickness at least 0.03 micrometer (300 angstroms) or no more than 0.3 micrometer (3,000 angstroms), although the thickness can be outside of these ranges. Conventional techniques for applying an adhesive layer coating mixture to the hole blocking layer include spraying, dip coating, roll coating, wire wound rod coating, gravure coating, Bird applicator coating, and the like. Drying of the deposited coating may be effected by any suitable conventional technique such as oven drying, infrared radiation drying, air drying and the like.

At least one electrophotographic imaging layer 8 is formed on the adhesive layer 4, blocking layer 3 or substrate 1. The electrophotographic imaging layer 8 may be a single layer that performs both charge-generating and charge transport functions as is well known in the art, or it may comprise multiple layers such as a charge generator layer 5 and charge transport layer 6.

Charge Generation Layer Examples

The charge generating layer 5, also known as the photogenerating layer, can be applied to the electrically conductive surface, or on other surfaces in between the substrate 1 and charge generating layer 5. A charge blocking layer or hole-blocking layer 3 may optionally be applied to the electrically conductive surface prior to the application of a charge generating layer 5. If desired, an adhesive layer 4 may be used between the charge blocking or hole-blocking layer 3 and the charge generating layer 5. Usually, the charge generation layer 5 is applied onto the blocking layer 3 and a charge transport layer 6, is formed on the charge generation layer 5. This structure may have the charge generation layer 5 on top of or below the charge transport layer 6.

Charge generator layers may comprise amorphous films of selenium and alloys of selenium and arsenic, tellurium, germanium and the like, hydrogenated amorphous silicon and compounds of silicon and germanium, carbon, oxygen, nitrogen and the like fabricated by vacuum evaporation or deposition. The charge-generator layers may also comprise inorganic pigments of crystalline selenium and its alloys; Group II-VI compounds; and organic pigments such as quinacridones, polycyclic pigments such as dibromo anthanthrone pigments, perylene and perinone diamines, polynuclear aromatic quinones, azo pigments including bis-, tris- and tetrakis-azos; and the like dispersed in a film forming polymeric binder and fabricated by solvent coating techniques.

Phthalocyanines have been employed as photogenerating materials for use in laser printers using infrared exposure systems. Infrared sensitivity is required for photoreceptors exposed to low-cost semiconductor laser diode light exposure devices. The absorption spectrum and photosensitivity of the phthalocyanines depend on the central metal atom of the compound. Many metal phthalocyanines have been reported and include, oxyvanadium phthalocyanine, chloroaluminum phthalocyanine, copper phthalocyanine, oxytitanium phthalocyanine, chlorogallium phthalocyanine, hydroxygallium phthalocyanine magnesium phthalocyanine and metal-free phthalocyanine. The phthalocyanines exist in many crystal forms, and have a strong influence on photogeneration.

Any suitable polymeric film forming binder material may be employed as the matrix in the charge-generating (photogenerating) binder layer. Thus, suitable organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrenebutadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in the resinous binder composition in various amounts. Generally, however, at least 5 percent by volume, or no more than 90 percent by volume of the photogenerating pigment is dispersed in at least 10 percent by volume, or no more than 95 percent by volume of the resinous binder. In another embodiment, at least 20 percent by volume, or no more than 30 percent by volume of the photogenerating pigment is dispersed in at least 70 percent by volume, or no more than 80 percent by volume of the resinous binder composition, although the volumes can be outside of these ranges. In one embodiment, about 8 percent by volume of the photogenerating pigment is dispersed in about 92 percent by volume of the resinous binder composition. The photogenerator layers can also fabricated by vacuum sublimation in which case there is no binder.

Any suitable and conventional technique may be used to mix and thereafter apply the photogenerating layer coating mixture. These application techniques include spraying, dip coating, roll coating, wire wound rod coating, vacuum sublimation, and the like. For some applications, the generator layer may be fabricated in a dot or line pattern. Removing of the solvent of a solvent coated layer may be effected by any suitable conventional technique such as oven drying, infrared radiation drying, air drying and the like.

Charge Transport Layer Examples

The charge transport layer 6 may comprise a charge transporting small molecule dissolved or molecularly dispersed in a film forming electrically inert polymer such as a polycarbonate. The term "dissolved" as employed herein is defined herein as forming a solution in which the small molecule is dissolved in the polymer to form a homogeneous phase. The expression "molecularly dispersed" is used herein is defined as a charge transporting small molecule dispersed in the polymer, the small molecules being dispersed in the polymer on a molecular scale. Any suitable charge transporting or electrically active small molecule may be employed in the charge transport layer of this invention. The expression charge transporting "small molecule" is defined herein as a monomer that allows the free charge photogenerated in the transport layer to be transported across the transport layer. Suitable charge transporting small molecules include, for example, pyrazolines such as 1-phenyl-3-(4'-diethylamino styryl)-5-(4"-diethylamino phenyl)pyrazoline, diamines such as N,N'-diphenyl-N,N'-bis(3-methylphenyl)-(1,1'-biphenyl)-4,4'-diamine, hydrazones such as N-phenyl-N-methyl-3-(9-ethyl)carbazyl hydrazone and 4-diethyl amino benzaldehyde-1,2-diphenyl hydrazone, and oxadiazoles such as 2,5-bis (4-N,N'-diethylaminophenyl)-1,2,4-oxadiazole, stilbenes and the like. As indicated above, suitable electrically active small molecule charge transporting compounds are dissolved or molecularly dispersed in electrically inactive polymeric film forming materials. A small molecule charge transporting compound that permits injection of holes from the pigment into the charge generating layer with high efficiency and transports them across the charge transport layer with very short transit times is N,N'-diphenyl-N,N'-bis(3-methylphenyl)-(1,1'-biphenyl)-4,4'-diamine (TPD). The CTL component may have the following structure:

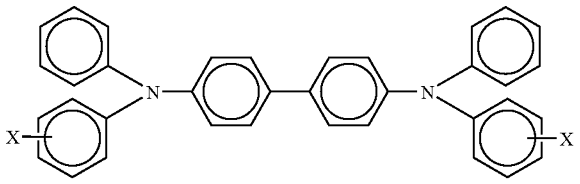

wherein X is a suitable hydrocarbon like alkyl, alkoxy, aryl, and derivatives thereof; a halogen, or mixtures thereof, and especially those substituents selected from the group consisting of Cl and $CH_3$.

If desired, the charge transport material in the charge transport layer may comprise a polymeric charge transport material or a combination of a small molecule charge transport material and a polymeric charge transport material.

Any suitable electrically inactive resin binder insoluble in the alcohol solvent may be employed in the charge transport layer of this invention. Inactive resin binders include polycarbonate resin (such as MAKROLON), polyester, polyarylate, polyacrylate, polyether, polysulfone, and the like. Molecular weights can vary, for example, from about 20,000 to about 150,000. Examples of binders include polycarbonates such as poly(4,4'-isopropylidene-diphenylene)carbonate (also referred to as bisphenol-A-polycarbonate, poly(4,4'-cyclohexylidinediphenylene)carbonate (referred to as bisphenol-Z polycarbonate), poly(4,4'-isopropylidene-3,3'-dimethyl-diphenyl)carbonate (also referred to as bisphenol-C-polycarbonate) and the like. Any suitable charge transporting polymer may also be used in the charge transporting layer of this invention. The charge transporting polymer should be insoluble in the alcohol solvent employed to apply the overcoat layer of this invention. These electrically active charge transporting polymeric materials should be capable of supporting the injection of photogenerated holes from the charge generation material and be capable of allowing the transport of these holes there through.

Any suitable and conventional technique may be used to mix and thereafter apply the charge transport layer coating mixture to the charge generating layer. These application techniques include spraying, dip coating, roll coating, wire wound rod coating, and the like. Drying of the deposited coating may be effected by any suitable conventional technique such as oven drying, infrared radiation drying, air drying and the like.

Generally, the thickness of the charge transport layer is at least 10 micrometer, or no more than 50 micrometers, but thicknesses outside this range can also be used. The hole transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layers can be maintained from about 2:1 to 200:1 and in some instances as great as 400:1, although the ratios can be outside of these ranges. The charge transport layer, is substantially non-absorbing to visible light or radiation in the region of intended use but is electrically "active" in that it allows the injection of photogenerated holes from the photoconductive layer, e.g., charge generation layer, and allows these holes to be transported through itself to selectively discharge a surface charge on the surface of the active layer.

Optional Overcoat Layer Examples

Examples of overcoat layers are comprised of a dispersion of nanoparticles, such as silica, metal oxides, ACUMIST (waxy polyethylene particles), polytetrafluoroethylene (PTFE or TEFLON®), and the like. The nanoparticles may be used to enhance the lubricity, scratch resistance, and wear resistance of the charge transport layer 6. In embodiments, an overcoat layer 7 is coated on the charge-transporting layer.

Any suitable and conventional technique may be utilized to form and thereafter apply the overcoat layer mixture to the imaging layer. These application techniques include, for example extrusion coating, draw bar coating, roll coating, wire wound rod coating, and the like. The overcoat layer 7 may be formed in a single coating step or in multiple coating steps. Drying of the deposited coating may be effected by any suitable conventional technique such as oven drying, infra red radiation drying, air drying and the like. The thickness of the dried overcoat layer may depend upon the abrasiveness of the charging, cleaning, development, transfer, etc. system employed and can range up to about 10 microns. In these embodiments, the thickness can be at least 0.5 microns, or no more than 20 microns in thickness. In other embodiments, the thickness can be at least 2 microns, or no more than 14 microns, although the thickness can be outside of these ranges. In specific embodiments, the dried microcapsules are present by at least 1 percent by weight of the total weight of the overcoat layer, or no more than 10 percent by weight of the total weight of the overcoat layer. In further embodiments, the dried microcapsules are present by at least 3 percent by weight of the total weight of the overcoat layer, or no more than 10 percent by weight of the total weight of the overcoat layer, although the amounts can be outside of these ranges.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and is illustrative of different compositions and conditions that can be used in the present embodiments. All proportions are by weight unless otherwise indicated. It will be apparent, however, that the embodiments can be practiced with many types of compositions and can have many different uses in accordance with the disclosure above and as pointed out hereinafter.

Example I

A photoconductor was prepared by providing a 0.02 micron thick titanium/zirconium layer coated (coater device used) on a biaxially oriented polyethylene naphthalate substrate (KALEDEX™ 2000) having a thickness of 3.5 mils, and applying thereon, with a extrusion applicator, a solution containing 0.6 weight percent 3 amino-propyltriethoxysilane (A 1100 obtained from GE Silicones), 0.2% acetic acid, 75.2 weight percent alcohol, and 20 weight percent heptane. This layer was then dried in a four zone forced air dryer for about 2 minutes at a maximum temperature of about 143° C. The resulting blocking layer had a dry thickness of 400 Angstroms.

An adhesive layer was then prepared by applying a wet coating over the blocking layer, using an extrusion applicator a 0.18% solids solution of polyarylate resin (ARDEL™ D100 ) in an 80:10:10 weight ratio mixture of tetrahydrofuran/monochlorobenzene/methylene chloride. This layer was then dried in a four zone forced air dryer for about 2 minutes at a maximum temperature of 99° C. The resulting adhesive layer had a dry thickness of 200 Angstroms.

A photogenerating layer was then prepared by applying a wet coating over the adhesive layer, using an extrusion applicator. The wet coating comprised a dispersion which was composed of 2.25% hydroxygallium phthalocyanine (Type V) and 2.5% of polycarbonate Z resin of weight average molecular weight of 20,000 (poly(4,4'-cyclohexylidine-diphenylene)carbonate (referred to as bisphenol-Z polycarbonate (PCZ200)), available from Mitsubishi Gas Chemical Corporation) in THF. The dispersion was formed by milling the components together in a stirred steel ball mill for approximately two hours. This layer was then dried in a four zone forced air dryer for about 3 minutes at a maximum temperature of about 143° C. The resulting adhesive layer had a dry thickness of about 0.6 microns (optical density at 660 nm of ~1).

A strip about 10 mm wide along one edge of the substrate web bearing the blocking layer and the adhesive layer was deliberately left uncoated by any of the photogenerating layer material to facilitate adequate electrical contact by the ground strip layer that was applied later.

The resulting imaging member web was then overcoated with two charge transport layers. The first charge transporting layer was prepared by applying a wet coating over the photogenerating layer using an extrusion applicator, solution containing 8.3 weight percent ,N'-diphenyl-N,N'-bis(3-methylphenyl)-1,1'-biphenyl-4,4'-diamine (mTBD), 8.3 weight percent Polycarbonate Resin with a molecular weight between 50,000 and 100,000 (MAKROLON® 5705, obtained from Farbenfabriken Bayer A.G) in methylene chloride. This layer was then dried in a four zone forced air dryer for about 2 minutes at a maximum temperature of about 143° C. The resulting first transport layer had a dry thickness of 14.5 microns.

The approximately 10 mm wide strip of the adhesive layer left uncoated by the charge generation layer was coated over with a ground strip layer simultaneously with the first transport layer. This ground strip layer, after drying along with the coated top and bottom layers of the charge transport layer at 116° C. in the forced air oven for minutes, had a dried thickness of about 12 to 20 micrometers. This ground strip layer is electrically grounded, by conventional means such as a carbon brush contact means during conventional xerographic imaging process.

The second charge transport layer was prepared by applying a wet coating over the first charge transporting layer, using an extrusion applicator, solution containing 5.4 weight percent ,N'-diphenyl-N,N'-bis(3-methylphenyl)-1,1'-biphenyl-4,4'-diamine (mTBD), 9.4 weight percent Polycarbonate Resin with a molecular weight between 50,000 and 100,000 (MAKROLON® 5705, obtained from Farbenfabriken Bayer A.G), and 0.8 weight percent pentaerythritol tetrakis(3,5-di-tert-butyl-4-hydroxyhydro-cinnamate) [IRGANOX® 1010, commercially available from Ciba Specialty Chemicals] in methylene chloride. This layer was then dried in a four zone forced air dryer for about 2 minutes at a maximum temperature of about 116° C. The resulting second transport layer had a dry thickness of 14.5 microns.

A back coating layer was prepared by applying a wet coating on the backside of the substrate using an extrusion applicator. The wet coating comprised a dispersion containing 9.2% high molecular weight polycarbonate (FPC170 obtained from Mitsubishi Gas Chemical), 1% Polyester resin (Vitel PE-2200 obtained from Bostik), and 0.8% PTFE powder (Zonyl MP1100 obtained from DuPont) in methylene chloride. This layer was then dried in a four zone forced air dryer for about 2.3 minutes at a maximum temperature of about 124° C. The resulting back coating had a dry thickness of 18 microns.

Example II

Figure 2:
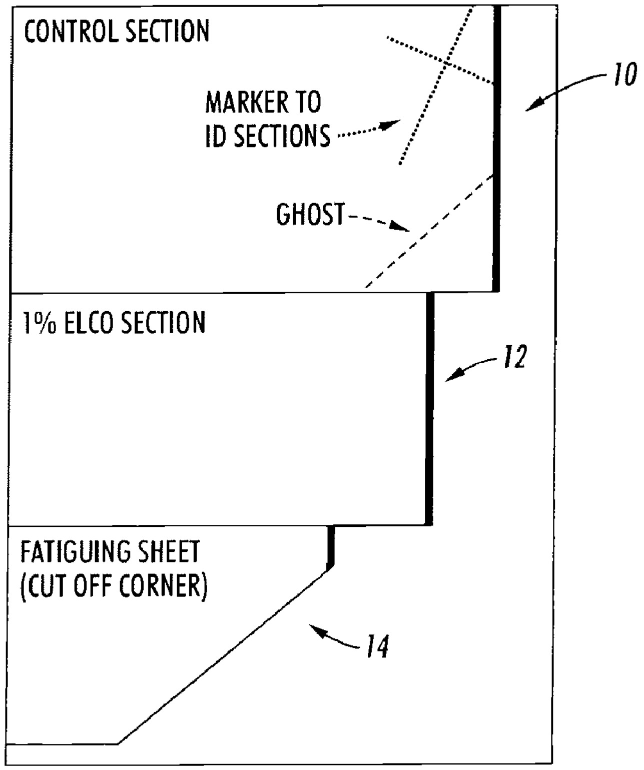
FIG. 2 is an illustration demonstrating scanned ghosting print results of the present embodiments as tested.

A photoreceptor as in Example I was fabricated with the difference that the first charge transporting layer coating solution was doped with 1 weight percent (based on dry solids) a zinc diakyldithiophosphate (Elco-103 available from Elco Corp., Cleveland, Ohio) (shown as 12 in FIG. 2). The zinc diakyldithiophosphate was heated at 100 C. for one hour prior to addition.

Example III

Photoreceptors from Example I and II were cut to the same size and then welded together to make a double seamed full length photoreceptor belt for printing.

Measurement of Properties

Photoreceptors of Examples I and II were electroded with a 3/8 inch diameter gold electrode dot of thickness of about 150 A and measured as described above with a cycle time of 2.6s, charging potential −600V, and injection 750 millseconds before charging. The injected charge density was 27 nC/cm$^2$. The image potential was measured 775 milliseconds after charging. Photoreceptors of each example were sampled at 8 different locations. Table 1 lists the drops in the magnitudes of the potentials.

TABLE 1

| Electricals | | | | |
|---|---|---|---|---|
| | Example I | | Example II | |
| | Absolute [V] | % of $V_o$ | Absolute [V] | % of $V_o$ |
| Average | 12.1 | 2.0 | 3.8 | 0.6 |
| Range | 10.4 to 14.5 | | 2.0 to 5.4 | |

Print Test

The belt of Example III was incorporated in a XEROX® iGen3 print engine in 10 pitch mode, e.g., each belt revolution produced ten 8×11 prints—five from the photoreceptors in Example I and five from Example II. For easier operation the once around ghost was induced by cutting off a corner of the first thirty 8×11 sheets followed by another twenty full sheets rather than using two different paper sizes (shown as 14 in FIG. 2). All prints were 20% magenta halftone. The first ten full sheets showed a darker corner (the ghost) corresponding to the missing corners of the previous sheets (shown as 10 in FIG. 2). All ten prints were analyzed. Each ghost in each print was measured ten times with respect to the rest of the print area (reference) with a colorimeter (light source D50, aperture 10°). Table 2 lists the color differences $\Delta E^*_{ab}$.

TABLE 2

| $\Delta E^*_{ab}$ | | |
|---|---|---|
| | Belt side with Example I | Belt side with Example II |
| Average | 3.5 | 0.4 |
| Range (5 prints) | 3.1 to 4.2 | 0.1 to 0.8 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A method for determining ghosting properties in a photoreceptor, comprising:

providing an photoreceptor comprising
- a substrate,
- an imaging layer disposed on the substrate, and
- an optional overcoat layer disposed on the imaging layer;

injecting the photoreceptor with a positive charge density of a product of CV wherein C is a geometric capacitance of the photoreceptor per unit area and V is a potential of from about 300 V to about 1000 V; and identifying the photoreceptor as exhibiting little or no ghosting when a magnitude of an image potential of the photoreceptor does not decrease after the injecting step.

2. The method of claim 1 further comprising identifying the photoreceptor as exhibiting little or no ghosting when the magnitude of the image potential of the photoreceptor does not decrease by more than about 1.5% after having been injected with a positive charge density of a product of CV wherein C is a geometric capacitance of the photoreceptor per unit area and V is a potential of from about 300 V to about 500 V.

3. The method of claim 1, wherein the imaging layer comprises a charge generation layer disposed on the substrate and a charge transport layer disposed on the charge generation layer.

4. The method of claim 2, wherein the decrease in image potential is from about 1% to about 1.5%.

5. The method of claim 1, wherein C is from about 20 $pF/cm^2$ to about 500 $pF/cm^2$.

6. The method of claim 5, wherein C is from about 50 $pF/cm^2$ to about 250 $pF/cm^2$.

7. The method of claim 1, wherein the image potential is from about −100V to about −1500V.

8. A method for determining ghosting properties in a photoreceptor, comprising:

providing an photoreceptor comprising a substrate, an imaging layer disposed on the substrate, and an optional overcoat layer disposed on the imaging layer;

injecting the photoreceptor with a positive charge density of a product of CV wherein C is a geometric capacitance of the photoreceptor per unit area and V is a potential of from about 300 V to about 1000 V;

monitoring a magnitude of an image potential of the photoreceptor after the injection; and identifying the photoreceptor as a photoreceptor that exhibits little to no ghosting when the magnitude of the image potential does not decrease by more than 1.5% after being injected.

9. The method of claim 8 further subjecting the photoreceptor to ten cycles of charging, exposing and erasing before being injected with the positive charge density.

10. The method of claim 9, wherein the charging time ranges from about 20 milliseconds to about 200 milliseconds and the charging potential ranges from about −300V to about −1000V.

11. The method of claim 9, wherein the overall cycle time ranges from about 0.5 seconds to about 3.0 seconds.

12. The method of claim 8 further including removing any remaining potential on the photoreceptor surface after injecting with the positive charge density.

13. The method of claim 8, wherein the positive charge density is injected between 100 milliseconds and 1000 milliseconds before the charging step of the next cycle.

14. The method of claim 8, wherein a change in magnitude of the image potential is measured by comparing the magnitude of the image potential in cycles subsequent to the tenth cycle and the magnitude of the image potential in the tenth cycle.

15. The method of claim 14, wherein the image potential is measured between about 0 milliseconds to about 1000 milliseconds after charging.

16. The method of claim 14, wherein the image potential is measured in an environment of 40% relative humidity at 22° C.

17. The method of claim 14, wherein the photoreceptor is rested in an environment of 40% relative humidity at 22° C. in the dark for at least two days prior to measuring.

18. The method of claim 8, wherein the charging is applied through a gold electrode.

19. The method of claim 8, wherein the charging is applied through ions from a corona device.

20. The method of claim 8, wherein C is from about 20 $pF/cm^2$ to about 500 $pF/cm^2$.

21. A method for determining ghosting properties in a photoreceptor, comprising:

providing an photoreceptor;

injecting the photoreceptor with a positive charge density of a product of CV wherein C is a geometric capacitance of the photoreceptor per unit area of from about 20 $pF/cm^2$ to about 500 $pF/cm^2$ and V is a potential of from about 300 V to about 1000 V; and identifying the photoreceptor as exhibiting little or no ghosting when a magnitude of an image potential of the photoreceptor does not decrease by more than about 1.5% after having been injected.

* * * * *